United States Patent [19]
Ogasawara

[11] Patent Number: 5,220,560
[45] Date of Patent: Jun. 15, 1993

[54] MODEM POOL SYSTEM BASED ON A PACKET COMMUNICATION PROCEDURE

[75] Inventor: Hajime Ogasawara, Kawasaki, Japan

[73] Assignee: Fujitsu Limited, Kawasaki, Japan

[21] Appl. No.: 642,502

[22] Filed: Jan. 17, 1991

[30] Foreign Application Priority Data

Jan. 19, 1990 [JP] Japan .................................. 2-008413

[51] Int. Cl.[5] ...................... H04L 12/56; H04M 11/00
[52] U.S. Cl. ..................................... 370/79; 370/94.1; 370/110.1; 379/94
[58] Field of Search ....................... 370/60, 79, 80, 93, 370/94.1, 110.1; 379/93, 94; 375/8

[56] References Cited

U.S. PATENT DOCUMENTS

| | | | |
|---|---|---|---|
| 4,884,269 | 11/1989 | Duncanson et al. | 370/110.1 |
| 4,903,263 | 2/1990 | Patel et al. | 370/110.1 |
| 4,975,900 | 12/1990 | Murata et al. | 370/110.1 |
| 5,051,992 | 9/1991 | Taniguchi et al. | 370/110.1 |
| 5,056,088 | 10/1991 | Price et al. | 370/94.1 |
| 5,067,125 | 11/1991 | Tsuchida | 370/110.1 |

Primary Examiner—Douglas W. Olms
Assistant Examiner—Alpus H. Hsu
Attorney, Agent, or Firm—Armstrong, Westerman, Hattori, McLeland & Westerman

[57] ABSTRACT

Where the ISDN subscriber terminal performs data transmission, the prefix transmitting section in the terminal transmits the prefix to a packet subsystem in advance. Based on this transmission, the modem pool apparatus designating section in the packet subsystem determines the corresponding modem pool apparatus to establish a communication path between the modem pool apparatus designating section and the modem pool apparatus. Further, the selected modem pool apparatus establishes a communication path to the start-stop transmission terminal. In accordance with the above sequence, a communication path of the ISDN subscriber terminal—packet subsystem—modem pool apparatus—the start-stop transmission terminal is established, thereby allowing the data communication between the ISDN subscriber terminal and start-stop transmission terminal to be realized.

8 Claims, 10 Drawing Sheets

MODEM POOL SYSTEM BASED ON A PACKET COMMUNICATION PROCEDURE

BACKGROUND OF THE INVENTION

1. Field of the Invention

The present invention relates to a system for facilitating data communications between an ISDN subscriber's terminal or a packet terminal in a packet service network and a start-stop terminal connected to an existing telephone network via a modem and an analog line.

2. Description of the Related Art

With the widening use of Integrated Service Digital Networks (ISDNs), requirements for data communications between a terminal connected to an ISDN via a digital line and a terminal connected to an existing telephone network via an analog line have increased. To meet these requirements by the use of existing equipment and communication systems, a modem must be installed on the side of a terminal connected to te ISDN via the digital line.

FIG. 1 illustrates a system for carrying out data communications between a terminal connected to an ISDN via a digital line and a terminal connected to an existing telephone network via an analog line by the use of existing equipment and communication systems.

First, to connect to an ISDN terminal (hereinafter referred to as start-stop transmission terminals) for making start-stop transmissions in an existing telephone network, a Public Telephone Network (PSTN) 102 is connected to an ISDN switching unit 101 via a trunk and start-stop transmission terminals 104-1, 104-2 are connected to the telephone network 102 via modems 103-1, 103-2.

ISDN subscriber terminals 105-1, 105-2 are connected to the ISDN switching unit 101 via network terminators Nt 106-1, 106-2 and terminal adapters TA 107-1, 107-2. For data communications between the ISDN subscriber terminal 105-1 and the start-stop transmission terminal 104-1 connected to the Public Telephone Network PSTN 102 via an analog line, a modem 103-3 must be installed between the ISDN subscriber terminal 105-1 and the terminal adapter TA 107-1.

The ISDN provides packet switching connection as a basic connection service. For the packet switching connection, a packet handler 108 is attached to the ISDN switching unit 101 to carry out protocol translation between the ISDN switching procedure and the packet switching procedure. A packet network 109 is connected to the ISDN via the packet handler 108. A packet terminal 110 is connected to the packet network 109.

Described next is a system for facilitating data communications among various types of terminals interconnected as described above.

First, for existing data communications between the start-stop terminals 104-1 and 104-2, a communication path Pa is established from the start-stop transmission terminal 104-1 through the modem 103-1, the telephone network PSTN 102 and the modem 103-2 to the start-stop transmission terminal 104-2. For data communications between the ISDN subscriber terminals 105-1 and 105-2 within the ISDN, a communication path Pb is established from the ISDN subscriber terminal 105-1 through the terminal adapter TA 107-1, the ISDN switching unit 101, the network terminator NT 106-2 and the terminal adapter TA 107-2 to the ISDN subscriber terminal 105-2.

Moreover, for data communications between the packet terminal 110 and the ISDN subscriber terminal 105-1, a communication path Pc is established from the packet terminal 110 through the packet network 109, the packet handler 108, the ISDN switching unit 101, the network terminator 106-1 and the terminal adapter 107-1 to the ISDN subscriber terminal 105-1.

For data communications between the start-stop transmission terminal 104-1 connected to an analog network and the ISDN subscriber terminal 105-1, the modem 103-3 must be installed between the ISDN subscriber terminal 105-1 and the terminal adapter TA 107-1. A communication path Pd is thereby established from the start-stop transmission terminal 104-1 through the modem 103-1, the telephone network PSTN 102, the ISDN switching unit 101, the network terminator NT 106-1, the terminal adapter TA 107-1 and the modem 103-3 to the ISDN subscriber terminal 105-1. A modem is needed because the ISDN terminal is not provided with any facility for terminating a protocol for the start-stop transmission.

Thus, the above conventional system has the following problems. First, a modem must be installed on the side of an ISDN subscriber terminal. That is, for an ISDN subscriber to establish communication with a terminal in an analog telephone network, a modem is always needed. This modem must be installed at the expense of the subscriber.

Second, switching between connection and disconnection of the modem installed on the side of the ISDN subscriber terminal is required according to the type of communication. That is, a modem installed at the expense of an ISDN subscriber is required only for communication with start-stop transmission terminals in the analog telephone network and not for communication with other ISDN subscriber terminals and packet terminals. Therefore, the modem must be inserted between the terminal adapter TA and the terminal for communication with a start-stop transmission terminal in the analog telephone network or removed for other communications to thereby directly connect the terminal adapter TA to the terminal.

SUMMARY OF THE INVENTION

It is therefore an object of the present invention to perform communication between an ISDN subscriber terminal and a start-stop transmission terminal in an analog telephone network without the need for each ISDN subscriber to install a modem.

The present invention is premised on an ISDN converting system including a portion for conducting data transmission between start-stop transmission terminals connected to the ISDN through packet terminals connected to it, a modem and an analog telephone line.

The present invention includes a portion for receiving packet data, a portion for converting packet data to character data and transmitting, a portion for receiving character data, for converting character data to packet data and transmitting it and a portion for setting a communication path based on a subscribers's number input from outside between start-stop transmission terminals corresponding to the subscriber's number. A modem pool system connected to an ISDN as a subscriber terminal is also provided. This system is provided plurally, corresponding to a plurality of transmission attributes such as line speed and data length.

Next, when a data communication is performed between a packet terminal and a start-stop terminal, the prefix transmitting portion transmits a prefix showing the communication attribute of the data transmission and also receives the subscriber's number transmitted by the packet terminal from the packet terminal side.

Further, a modem pool system designating portion is provided. This designating portion selects from among a plurality of modem pool systems one corresponding to the prefix value transmitted from the packet terminal side by the prefix transmitting portion. The communication path is first set between modem pool systems and then between start-stop terminals corresponding to the receiving subscriber's number by outputting the receiving subscriber's number transmitted from the packet terminal side to the system. In this way, the modem pool system sets the communication path between the packet terminal and the start-stop terminal.

With this construction, it is possible to execute a communication between various terminals in an ISDN and a start-stop terminal in an analog network, and a communication between a packet terminal contained in a packet network connected to an ISDN and a start-stop terminal in an analog network without providing a modem at the ISDN terminal side or the packet terminal side.

BRIEF DESCRIPTION OF THE DRAWINGS

Further objects and advantages of the present invention will be apparent from the following description of the principle and preferred embodiments of the invention with reference to the accompanying drawings in which.

DESCRIPTION OF THE PREFERRED EMBODIMENT

Principle of the Invention

Figure 1:
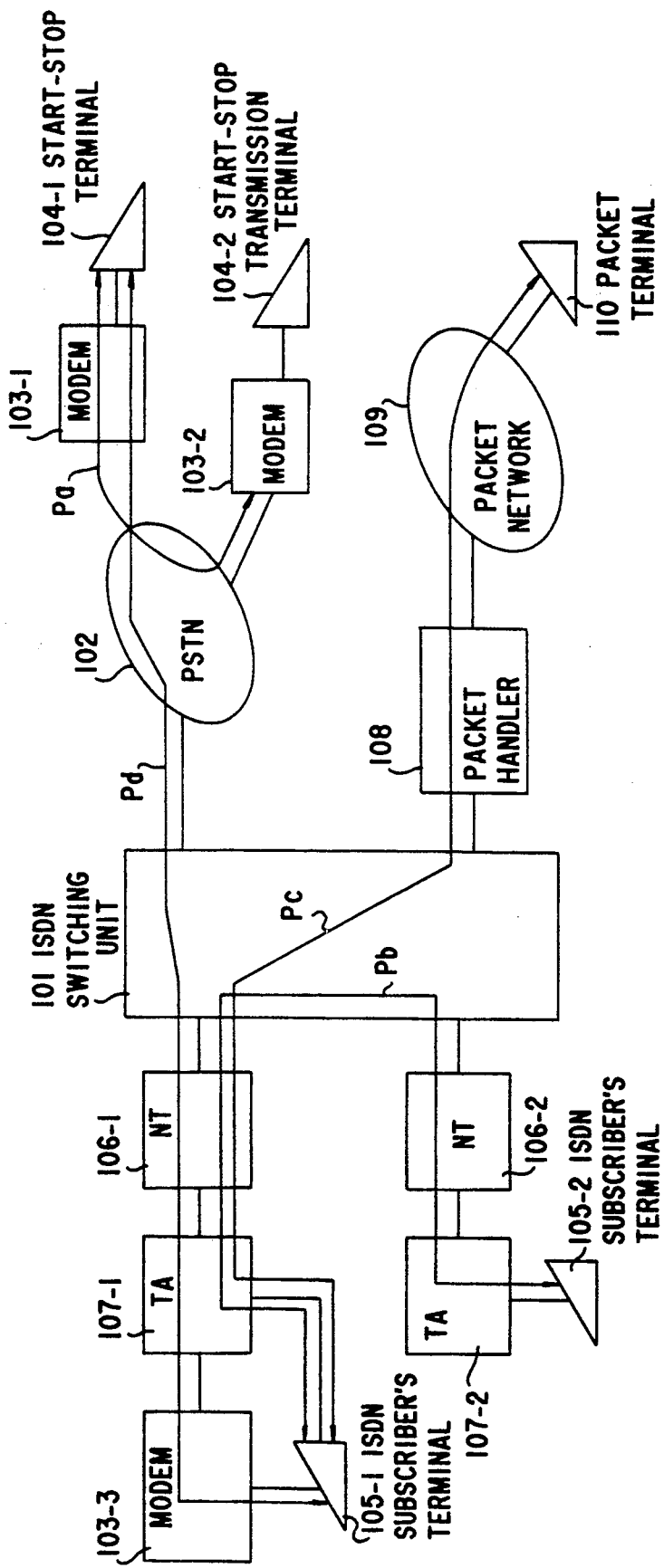
FIG. 1 is a diagram for explaining a conventional communication system.
Figure 2:
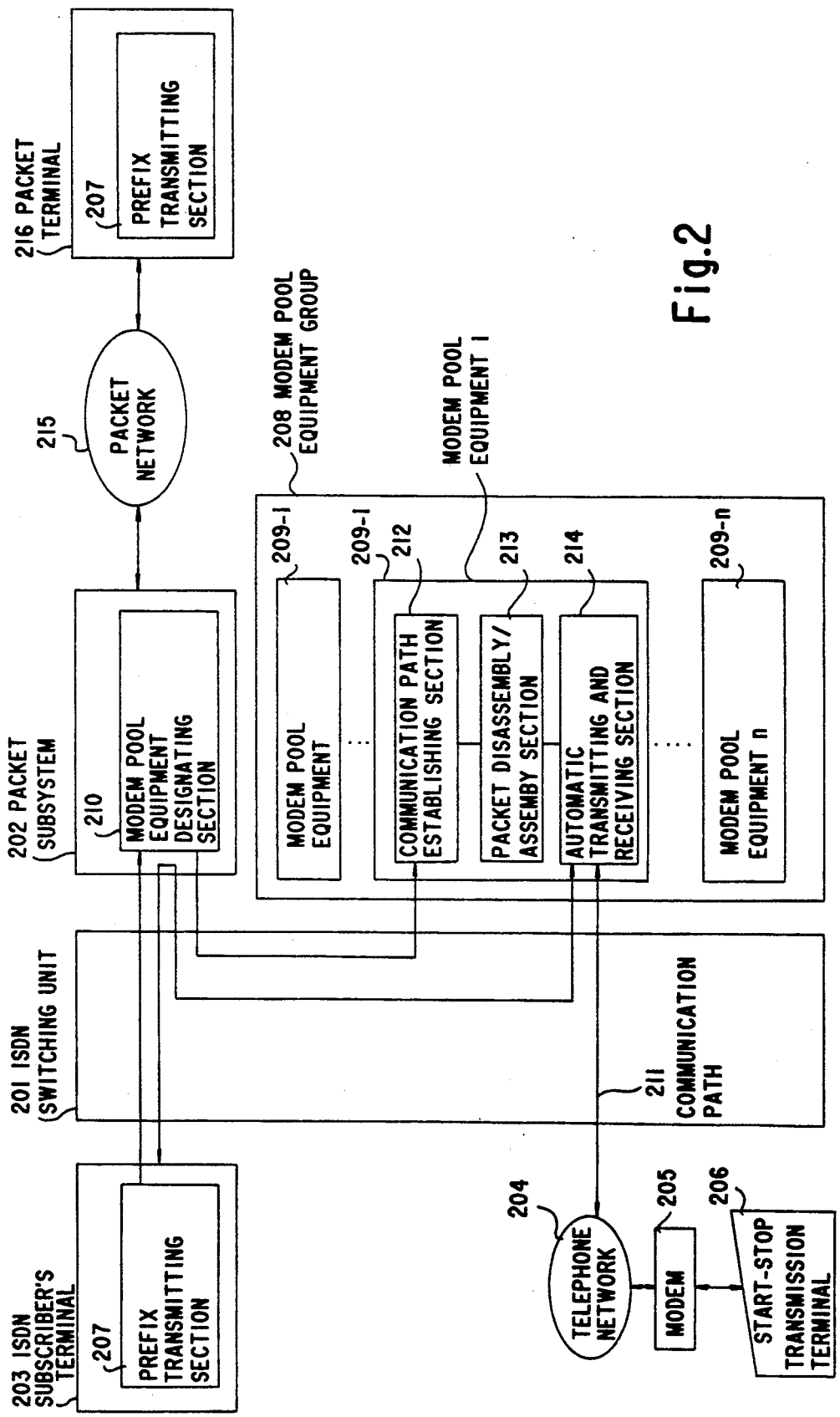
FIG. 2 is a block diagram illustrating the principle of the present invention.

FIG. 2 is a block diagram illustrating the principle of the present invention. The present invention is premised on a hybrid communication network comprising an ISDN switching unit 201, an ISDN subscriber terminal 203 connected to an ISDN via a digital line, a packet subsystem 202 for connecting a packet network 215 to the ISDN, a telephone network 204 connected to the ISDN via an analog line and a start-stop transmission terminal 206 connected to the telephone network 204 via a modem 205.

First, a prefix transmitting section 207 transmits a prefix indicating the type of modem to which data is to be transmitted, such as line speed or data length, to the packet subsystem 202.

The prefix transmitting section 207 is installed in both the ISDN subscriber terminals 203 and the packet terminal 216 in the packet network 215. Before the ISDN subscriber terminal 203 or the packet terminal 216 transmits data to the start-stop transmission terminal 206 connected to the telephone network 204 via the modem 205, the prefix transmitting section 207 in the ISDN subscriber terminal 203 or the packet terminal 216 transmits a prefix to the packet subsystem 202. More specifically, the prefix transmitting section 207 in the ISDN subscriber terminal 203 transmits a prefix to the packet subsystem 202 via the ISDN switching unit 201, while the prefix transmitting section 207 in the packet terminal 216 transmits a prefix to the packet subsystem 202 via the packet network 215.

Next, a modem pool equipment designating section 210 is responsive to the prefix transmitted from the prefix transmitting section 207 to designate a piece of modem pool equipment 209-$i$ ($1 \leq i \leq n$) that is used for data transmission from among pieces of modem pool equipment (209-1 to 209-$n$) in a modem pool equipment group 208 and establish a communication path between the packet subsystem 202 and the modem pool equipment piece 209-$i$. To this end, the modem pool equipment designating section 210 first translates a value of the prefix to a key telephone number provided for each type of modem. The modem types correspond to the modem-pool-equipment groups (e.g. 208) each of which comprises plural pieces of modem pool equipment 209-$l$ through 209-$n$ which are equal in modem attributes such as line speed or data length. Subsequently, the designating section 210 accesses a modem pool equipment group which is assigned the key number by the use of the above key telephone number and determines the use of the piece of modem pool equipment 209-$i$ which is not currently in use, for data communications Then, the designating section 210 establishes a communication path between the piece of modem pool equipment 209-$i$ and the packet subsystem 202.

Each piece of modem pool equipment (209-1, 209-2, . . . , 209-$i$, . . . 209-$n$) comprises a communication path establishing section 212, a packet disassembly/assembly section 213 and an automatic transmitting and receiving section 214.

The communication path establishing section 212 in the above-described piece of modem pool equipment 209-$i$ used for data communication establishes a communication path to the start-stop transmission terminal 206, which is the destination of the data and is connected to the telephone network 204. Thus, all communication paths 211 are established between the ISDN subscriber terminal 203 or the packet terminal 216, which is going to perform data communication, and the start-stop transmission terminal 206.

The automatic transmitting and receiving section 214 first receives data sent by the ISDN subscriber terminal 203, the packet terminal 216 or the start-stop transmission terminal 206 connected to the telephone network 204 over the communication path 211 and outputs it to the packet disassembly/assembly section 213. In this case, the data sent by the ISDN subscriber terminal 203 or the packet terminal 216 is packet data, while the data sent by the start-stop transmission terminal 206 is character data. The automatic transmitting and receiving section 214 transmits data input from the packet disassembly/assembly section 213 to the start-stop transmission terminal 206, the ISDN subscriber terminal 203 or the packet terminal 216 via the communication paths 211 established by the communication path establishing section 212.

The packet disassembly/assembly section 213 translates data input from the automatic transmitting and receiving section 214 from packet data to character data or from character data to packet data and outputs it to the automatic transmitting and receiving section 214. More specifically, the packet disassembly/assembly section 213 translates packet data sent by the ISDN subscriber terminal 203 or the packet terminal 216 and received via the automatic transmitting and receiving section 214 to character data for transmission to the start-stop transmission terminal 206 connected to the telephone network 204. Conversely, the packet disassembly/assembly section 213 translates character data transmitted by the start-stop transmission terminal 206 and received via the automatic transmitting and receiving section 214 to packet data for transmission to the ISDN subscriber terminal 203 or the packet terminal 216.

The operation of the above system configuration representing the principle of the invention is described below.

First, transmission of data from the ISDN subscriber terminal 203 to the start-stop transmission terminal 206 connected to the telephone network 204 via the modem 205 is described as a first example of an operation.

In this operation, prior to data transmission, the prefix transmitting section 207 in the ISDN subscriber terminal 203 transmits a prefix, i.e., a value indicating a modem attribute, such as line speed or data length, to the packet subsystem 202 via the ISDN switching unit 201.

When the packet subsystem 202 receives the prefix sent by the prefix transmitting section 207 in the ISDN subscriber terminal 203, the modem pool equipment designating section 210 in the packet subsystem 202 determines the available piece of modem pool equipment 209-i having the modem attribute indicated by the prefix value and establishes a communication path between the modem pool equipment 209-i and the packet subsystem 202.

The modem pool equipment group 208 comprises a plurality of pieces of modem pool equipment (209-1, 209-2, ..., 209-i, ..., 209-n). Each modem pool equipment group having an equal modem attribute is assigned a key telephone number indicative of the group. The modem pool equipment designating section 210 translates the prefix to the key telephone number of the modem pool equipment group having the modem attribute indicated by the prefix value and accesses the modem pool equipment group with the key telephone number. If there is a free modem pool equipment piece in the modem pool equipment group, then access to it will be granted, thereby establishing a communication path between the free modem pool equipment piece and the packet subsystem 202.

When the piece of modem pool equipment 209-i to be used is determined by the modem pool equipment designating section 210, its communication path establishing section 212 establishes a communication path to the start-stop transmission terminal 206 to which data is to be transmitted. This establishes the communication path 211 from the ISDN subscriber's terminal 203 through the ISDN switching unit 201, the packet subsystem 202, the ISDN switching unit 201, the piece of modem pool equipment 209-i, the ISDN switching circuit 201, the telephone network 204 and the modem 205, to the start-stop transmission terminal 206. After the communication path 211 has been established by the communication path establishing section 212 on the basis of the above sequence, data can be transmitted over the communication path 211. That is, the ISDN subscriber terminal 203 transmits packet data to the packet subsystem 202 via the ISDN switching unit 201. The packet subsystem 202 transfers the packet data to the piece of modem pool equipment 209-i. In the piece of modem pool equipment 209-i, the automatic transmitting and receiving section 214 first receives the packet data for transmission to the packet disassembly/assembly section 213. The packet disassembly/assembly section 213 disassembles the received packet data into character data and sends the disassembled data to the automatic transmitting and receiving section 214 again. The automatic transmitting and receiving section 214 transmits the character data received from the packet disassembly/assembly section 213 to the start-stop transmission terminal 206 connected to the telephone network 204 via the ISDN switching unit 201. This enables transmission of data from the ISDN subscriber terminal 203 to the start-stop transmission terminal 206. The communication path 211 is disconnected at the completion of the data transmission, whereby the data communication is terminated.

Next, transmission of data from the start-stop transmission terminal 206 connected to the telephone network 204 to the ISDN subscriber terminal 203, which is opposite to the first operation described above in data flow, is described as a second example of operation. In this operation, data is transmitted over the communication path 211 in the opposite direction to that in the first operation of the data transmission from the ISDN subscriber terminal 203 to the start-stop transmission terminal 206.

That is, data transmitted from the start-stop transmission terminal 206 is translated by the modem 205 to data in a form acceptable to the analog telephone network 204 and then sent to the piece of modem pool equipment 209-i via the telephone network 204 and the ISDN switching unit 201. The data (character data) is received by the automatic transmitting and receiving section 214 in the modem pool equipment 209-i and then sent to the packet disassembly/assembly section 213. The packet disassembly/assembly section 213 assembles the received character data into packet data and outputs it again to the automatic transmitting and receiving section 214. The automatic transmitting and receiving section 214 transmits the packet data to the ISDN subscriber terminal 203. That is, the packet data is transmitted to the ISDN subscriber terminal 203 via the packet subsystem 202 and the ISDN switching circuit 201. This enables transmission of data from the start-stop transmission terminal 206 to the ISDN subscriber terminal 203. The communication path 211 is disconnected at the completion of data transmission, thereby terminating the communication.

Next, third and fourth examples of operation are described, in which data is transmitted between the packet terminal 216 in the packet network 215 and the start-stop transmission terminal 206 in the telephone network 204. These examples can be implemented in substantially the same way as in the first and second examples.

First, the third example is described in which packet data is transmitted from the packet terminal 216 to the start-stop transmission terminal 206.

In this operation, the prefix transmitting section 207 in the packet terminal 216 transmits a prefix prior to the transmission of packet data. The prefix is sent to the packet subsystem 202 via the packet network 215. The modem pool equipment designating section 210 in the packet subsystem 202 determines, on the basis of the prefix, the piece of modem pool equipment 209-i to be used and sets up a communication path. The piece of modem pool equipment 209-i is determined as described above.

When the piece of modem pool equipment 209-i is determined, its communication path establishing section 212 establishes a communication path between the start-stop transmission terminal 206 and the packet terminal 216. Thus, a communication path extending from the start-stop transmission terminal 206 through the modem 205, the telephone network 204, the ISDN switching unit 201, the piece of modem pool equipment 209-i, the packet subsystem 202 and the packet network 215 to the packet terminal 216 is established to permit data transmission to be started.

That is, the packet data transmitted by the packet terminal 216 is sent to the piece of modem pool equipment 209-i via the packet network 215 and the packet subsystem 202 and received by the automatic transmitting and receiving section 214 in the piece of modem pool equipment 209-i. The automatic transmitting and receiving section 214 sends the received packet data to the packet disassembly/assembly section 213, which translates the packet data to character data and outputs it again to the automatic transmitting and receiving section 214. The character data sent by the automatic transmitting and receiving section 214 is transmitted toward the start-stop transmission terminal 206. This data reaches the start-stop transmission terminal 206 via the ISDN switching circuit 201, the telephone network 204 and the modem 205.

Next, the fourth example of operation is described in which data is transmitted from the start-stop transmission terminal 206 to the packet terminal 216. This is the reverse of the above-described third example.

In this operation, character data transmitted from the start-stop transmission terminal 206 is transferred to the modem pool equipment 209-i via the modem 205, the telephone network 204 and the ISDN switching unit 201. It is received by the automatic transmitting and receiving section 214 in the piece of modem pool equipment 209-i and then sent to the packet disassembly/assembly section 213. The packet disassembly/assembly section 213 assembles the received character data into packet data and outputs it again to the automatic transmitting and receiving section 214. The automatic transmitting and receiving section 214 transmits the packet data toward the packet terminal 216. The packet data is transferred to the packet terminal 216 via the ISDN switching circuit 201, the packet subsystem 202 and the packet network 215.

The Preferred Embodiment

The preferred embodiment of the present invention will be described hereinafter.

Figure 3:
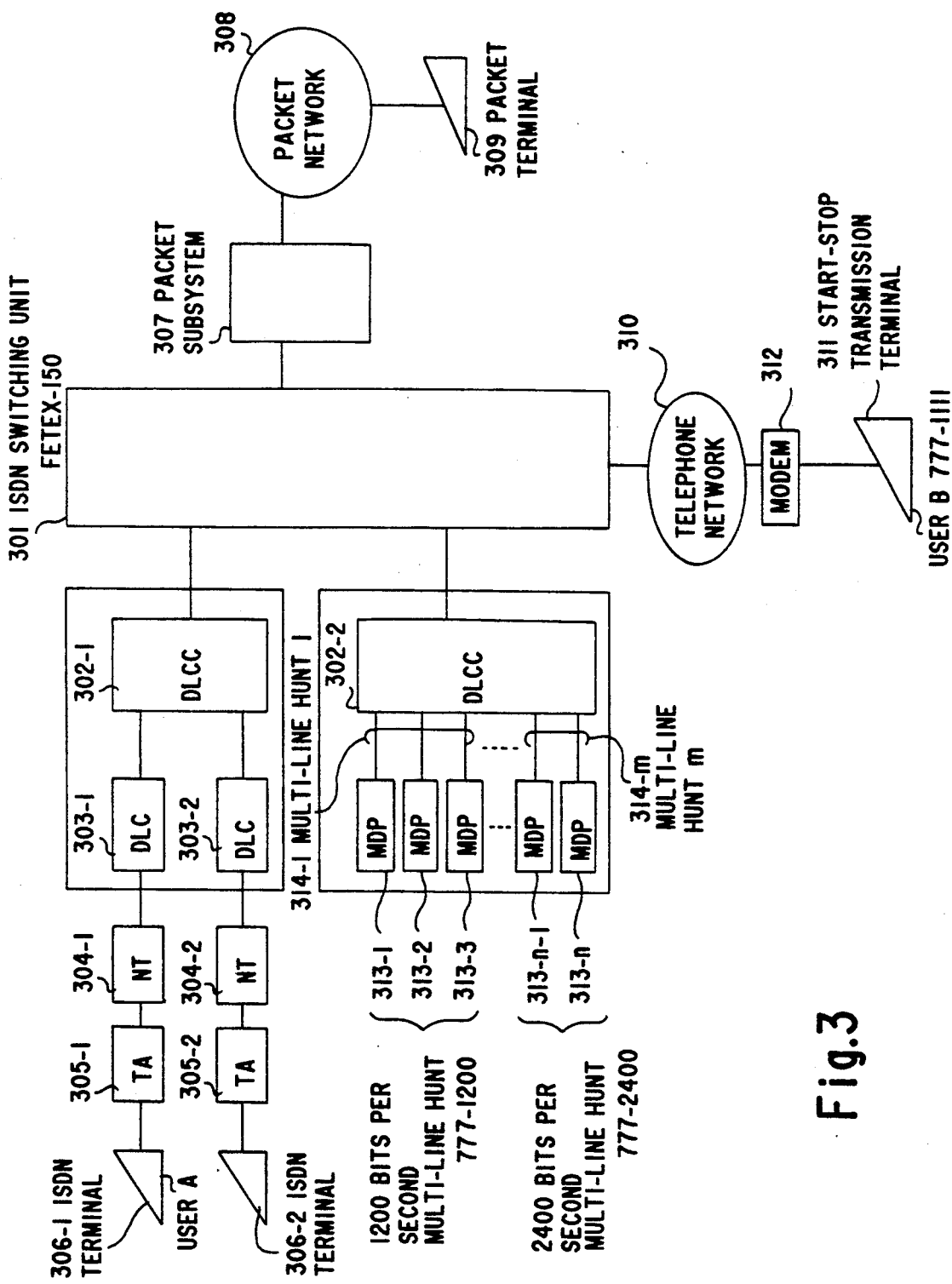
FIG. 3 illustrates a system configuration according to an embodiment of the present invention.

FIG. 3 illustrates a system configuration according to the preferred embodiment of the present invention.

A network terminator NT 304 installed in an ISDN subscriber's house is connected to an ISDN switching unit 301 via a digital subscriber line card controller DLCC 302-1 and a digital subscriber line card DLC 303. Furthermore, an ISDN terminal 306 is connected to the NT 304 via a terminal adapter TA 305.

For switching connection of packet data, the ISDN switching unit 301 is equipped with a packet subsystem 307 which is connected to a packet network 308. The packet network 308 contains a packet terminal 309.

An analog telephone network 310 is connected to the ISDN switching unit 301 via a trunk (not shown). To the analog telephone network 310 is connected a start-stop transmission terminal 311 via a modem 312.

In the present invention, to permit data communication between the ISDN terminal 306 and the start-stop transmission terminal 311 connected to the analog telephone network 310, equipment 313 called modem pool equipment is installed on the side of the ISDN switching unit 301 instead of installing a modem between the ISDN terminal 306 and the terminal adapter TA 305 as in the conventional system. Moreover, communication between the terminals is performed using the packet switching procedure.

The modem pool equipment 313 has modem functions and a function of data translation between packet data and character data. As the procedure of communication between the terminals, the line switching procedure might be adopted instead of the packet switching procedure. However, the packet switching procedure has higher line-use efficiency than the line switching procedure and the advantage that communication is permitted among various types of terminals. The packet switching procedure is therefore adopted in the present invention.

The ISDN switching unit 301 is equipped with plural pieces (n) of modem pool equipment MDP 313 (313-1, 313-2, ..., 313-n). The n pieces of modem pool equipment MDP 313 are connected to the ISDN switching unit 301 via the digital subscriber line card controller 302-2. From the ISDN switching unit 301, each piece of modem pool equipment MDP 313 can be regarded as a subscriber terminal of the ISDN. The n pieces of modem pool equipment MDP 313 (313-1, 313-2, ..., 313-n) are separated into several groups according to a modem attribute such as line speed or data length and each group is assigned a multi-line hunt 314 which is a key telephone number. Thus, the pieces of modem pool equipment 313 grouped by the multi-line hunt 314 will have an equal modem attribute. In the figure, three pieces of modem pool equipment 313-1, 313-2, 313-3 are grouped by multi-line hunt 314-1 and two pieces of modem pool equipment 313-n-1, 313-n are grouped by multi-line hunt 314-m.

For example, the pieces of modem pool equipment 313-1, 313-2, 313-3 have, as their modem attribute, a line speed of 1200 bits per second and are thus grouped by multi-line hunt "777-1200". However, the pieces of modem pool equipment 313-n-1, 313-n have, as their modem attribute, a line speed of 2400 bits per second and are thus grouped by multi-line hunt "777-2400".

Suppose now that the ISDN terminal 306-1 is user A, the start-stop transmission terminal 311 contained in the analog telephone network 310 is user B, and data communication is performed between the users A and B.

Suppose also that the subscriber number of the user B, which is a destination of data, is "777-1111".

When the ISDN terminal 306-1 transmits data to the start-stop transmission terminal 311, a communication path is established prior to the transmission of data.

First, the ISDN terminal 306-1 makes a call in the packet switching procedure of the D channel of the ISDN. This call is sent to the packet subsystem 307 via the terminal adapter TA 305-1, the network terminator NT 304-1, the digital subscriber line card DLC 303-1, the digital subscriber line card controller 302-1 and the ISDN switching unit 301.

The ISDN terminal 306-1 first sends to the packet subsystem 307 a receive subscriber number indicating the destination of the communication. The receive subscriber number includes a prefix value indicating a modem attribute, such as line speed or data length, of a modem to be used for communication, in addition to the telephone number "777-1111" of the start-stop transmission terminal 311 connected to the analog telephone network 310. If that the prefix value indicating a modem attribute of a line speed of 1200 bits per second is 8, the ISDN terminal 306-1 transmits to the packet subsystem 307 a receive subscriber number "8-777-1111".

The packet subsystem 307 determines the piece of modem pool equipment 313 to be used for communication on the basis of the prefix value contained in the receive subscriber number sent from the ISDN terminal 306-1 and then establishes a communication path between the packet subsystem 307 and the determined modem pool equipment.

In determining the piece of modem pool equipment 313, the packet subsystem 307 first translates the prefix value to data of the multi-line hunt 314. For example, the prefix value 8, indicating a modem attribute of a line speed of 1200 bits per second, is translated to the multi-line hunt (key telephone number) 314 of "777-1200". As a result, the packet subsystem 307 accesses three pieces of modem pool equipment 313-1, 313-2 and 313-3 grouped by a multi-line hunt 314-1 of "777-1200" to select one piece of modem pool equipment. More specifically, the packet subsystem 307 decides whether the modem pool equipment 314-1 is busy or not. If it is not, it establishes a communication path to the modem pool equipment 313-1. If it is, a decision is made as to whether or not the piece of modem pool equipment 313-2 is available. If it is not, a decision is made as to whether or not the modem pool equipment 313-3 is available. If there is an available piece of modem pool equipment, a communication path is set up between it and the packet subsystem 307. When all pieces of modem pool equipment are busy, the busy state will result. If the piece of modem pool equipment 313-2 (the piece of modem pool equipment 313-1 are busy) is used for communication, a communication path between the packet subsystem 307 and the piece of modem pool equipment 313-2 is established.

Next, the piece of modem pool equipment 313-2 receives the subscriber number "777-1111" of the start-stop transmission terminal 311 which is the destination of the communication from the packet subsystem 307, and then establishes a communication path to the start-stop transmission terminal 311.

Consequently, a communication path is established between the ISDN terminal 306-1 (user A) and the start-stop transmission terminal 311 (user B). More specifically, a communication path is established which extends from the ISDN terminal 306-1 through the TA 305, the NT 304-1, the DLC 303-1, the DLCC 302-1, the ISDN switching unit 301, the packet subsystem 307, the ISDN switching unit 301, the DLCC 302-2, the MDP 313-2, the DLCC 302-2, the the ISDN switching unit 301, the telephone network 310 and the modem 312 to the start-stop transmission terminal 311.

When the communication path between user A and user B is established, data transmission is initiated.

Data transmitted by the ISDN terminal 306-1 (user A) is packet data sent to the piece of modem pool equipment 313-2 over the communication path. The piece of modem pool equipment 313-2 translates the packet data to character data and sends it onto the communication path directed to the start-stop transmission terminal 311 (user B). The character data is transferred to the start-stop transmission terminal 311 (user B) over the communication path. If, on the other hand, data is transmitted from the start-stop transmission terminal 311 (user B) to the ISDN terminal 306-1 (user A), it is sent in the direction opposite to that in the above operation over the communication path established in a way similar to that in the above case. More specifically, data transmitted by the start-stop transmission terminal 311 is sent to the piece of modem pool equipment 313-2 via the modem 312, the telephone network 310, the ISDN switching unit 301 and the DLCC 302-2. The data from the start-stop transmission terminal 311 is character data. Thus, the piece of modem pool equipment 313-2 translates the character data to packet data and transmits it to the ISDN terminal 306-1.

The transmitted packet data is sent to the packet subsystem 307 via the DLCC 302-2 and the ISDN switching unit 301 and then arrives at the ISDN terminal 306-1 via the ISDN switching unit 301, DLCC 302-1, DLC 303-1, NT 304-1 and TA 305-1.

In this way data communication is permitted between the ISDN terminal 306 and the start-stop transmission terminal 311 connected to the telephone network 310.

Data communication between the packet terminal 309 in the packet network 308 and the start-stop transmission terminal 311 in the analog telephone network 310 can also be performed similarly using the modem pool equipment 313.

First, the packet terminal 309 transmits the subscriber number and the prefix of the start-stop transmission terminal 311 to the packet subsystem 307 via the packet network 308. The packet subsystem 307 determines the piece of modem pool equipment 313 to be used on the basis of the received prefix and establishes a communication path to it. Subsequently, the piece of modem pool equipment 313 receives the subscriber number of the start-stop transmission terminal 311 from the packet subsystem 307 and establishes a communication path between the piece of modem pool equipment 313 and the start-stop transmission terminal 311. The communication path between the packet terminal 309 and the start-stop transmission terminal 311 is thereby established to initiate actual data communication.

Figure 4:
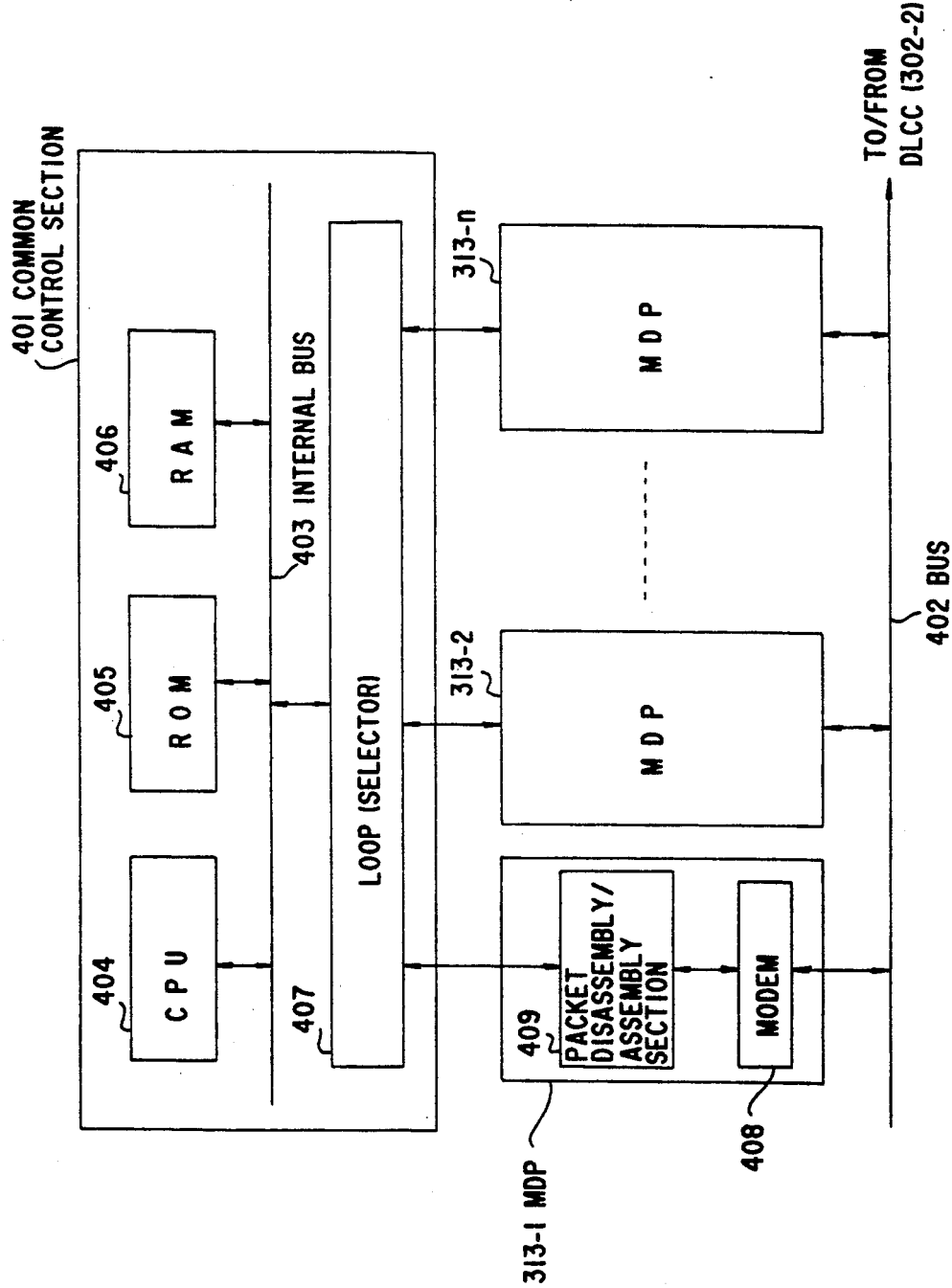
FIG. 4 is a first block diagram of the modem equipment of FIG. 2.

Data transmitted by the packet terminal 309 is packet data. The piece of modem pool equipment 313 disassembles the packet data into character data and transmits it to the start-stop transmission terminal 311 over the communication path. The character data transmitted by the start-stop transmission terminal 311 is assembled into packet data by the piece of modem pool equipment 313, which is then transmitted to the packet terminal 309 over the communication path. FIG. 4 is a block diagram of the modem pool equipment 313.

In this configuration, n pieces of modem pool equipment MDP 313 (313-1, 313-2, ..., 313-n) are connected to a common control section 401 which controls all pieces of modem pool equipment 313. The pieces of modem pool equipment 313-0 to 313-n are connected to a bus 402 for connection to the digital subscriber line card controller 302-2.

The common control section 401 comprises an internal bus 403, a CPU for controlling all the pieces of modem pool equipment 313-0 to 313-n, a ROM 405 for storing a control program, a RAM 406 serving as a work area and a loop selector LOOP 407 to which n pieces of modem pool equipment 313 are connected. Each piece of modem pool equipment, which have different modem attributes such as line speed or data length, includes a modem 408 for modulating and demodulating data and a packet disassembly/assembly section 409 for disassembly and assembly of packet data.

Next, the operation of the modem pool equipment is described with reference to FIGS. 3 and 4. When data communication is carried out between the ISDN terminal 306-1 (user A) and the start-stop transmission terminal 306-1 (user A) and the start-stop transmission terminal 311 (user B) in the telephone network 310, the packet subsystem 307 accesses the piece of modem pool equipment 313 using the multi-line hunt 314. That is, the piece of modem pool equipment 313 is accesses using such a telephone number as represented by the multi-line hunt (key number) "777-1200" of FIG. 3.

The pieces of modem pool equipment 313-i to 313-n having the same modem attribute and grouped by the multi-line hunt 314 are accessed in sequence and a communication path is established between a piece of modem pool equipment 313-i which is not busy and the packet subsystem 307. When the plural pieces of modem pool equipment grouped by the multi-line hunt 314 are all busy, a busy signal is sent to the packet subsystem 307.

When the communication path between the modem pool equipment 313-1 and the packet subsystem 307 is established, the subscriber number "777-1111" of the start-stop transmission terminal 311 connected to the telephone network 310 is passed from the packet subsystem 307 to the piece of modem pool equipment 313-1. In the piece of modem pool equipment 313-1, the CPU 404 of the common control section 401 of FIG. 4 controls the modem 408 in accordance with the control program stored in the ROM 405. The modem 408 accesses the subscriber number "777-1111" of the start-stop transmission terminal 311 (user B), whereby a communication path is established between the modem pool equipment 313-1 and the start-stop transmission terminal 311.

When the communication path is established, packet data transmitted by the ISDN terminal 306-1 is input to the piece of modem pool equipment 313-1 via the packet subsystem 307, the ISDN switching unit 301 and the digital subscriber line card controller DLCC 302-2. In the piece of modem pool equipment 313-1, the packet data is automatically received by the modem 408 and passed to the packet disassembly/assembly section 409. The packet disassembly/assembly section 409 disassembles the received packet data into character data and outputs it to the modem 408 again. The modem 408 automatically transmits the received character data to the start-stop transmission terminal 311, that is, the data's destination. The character data is sent to the DLCC 302-2 over the bus 402 and then transferred to the start-stop transmission terminal 311 via the ISDN switching unit 301, the telephone network 310 and the modem 312.

The character data transmitted from the start-stop transmission terminal 311 (user B) is sent to the DLCC 302-2 via the modem 312, the telephone network 310 and the ISDN switching unit 301 and then passed to the piece of modem pool equipment 313-1, which has a communication path established thereto, over the bus 402.

The modem 408 of the modem pool equipment 313-1 automatically receives the character data and passes it to the packet disassembly/assembly section 409. The packet disassembly/assembly section 409 assembles the character data into packet data and outputs it to the modem 408 again. The modem 408 automatically transmits the received packet data to the ISDN terminal 306-1. The packet data is sent to the DLCC 302-2 over the bus 402 and then transferred to the ISDN terminal 306-1 (user A) via the ISDN switching unit 301, the packet subsystem 307, the ISDN switching unit 301, the DLCC 302-1, the DLC 303-1, the NT 304-1 and the TA 305-1.

Figure 5:
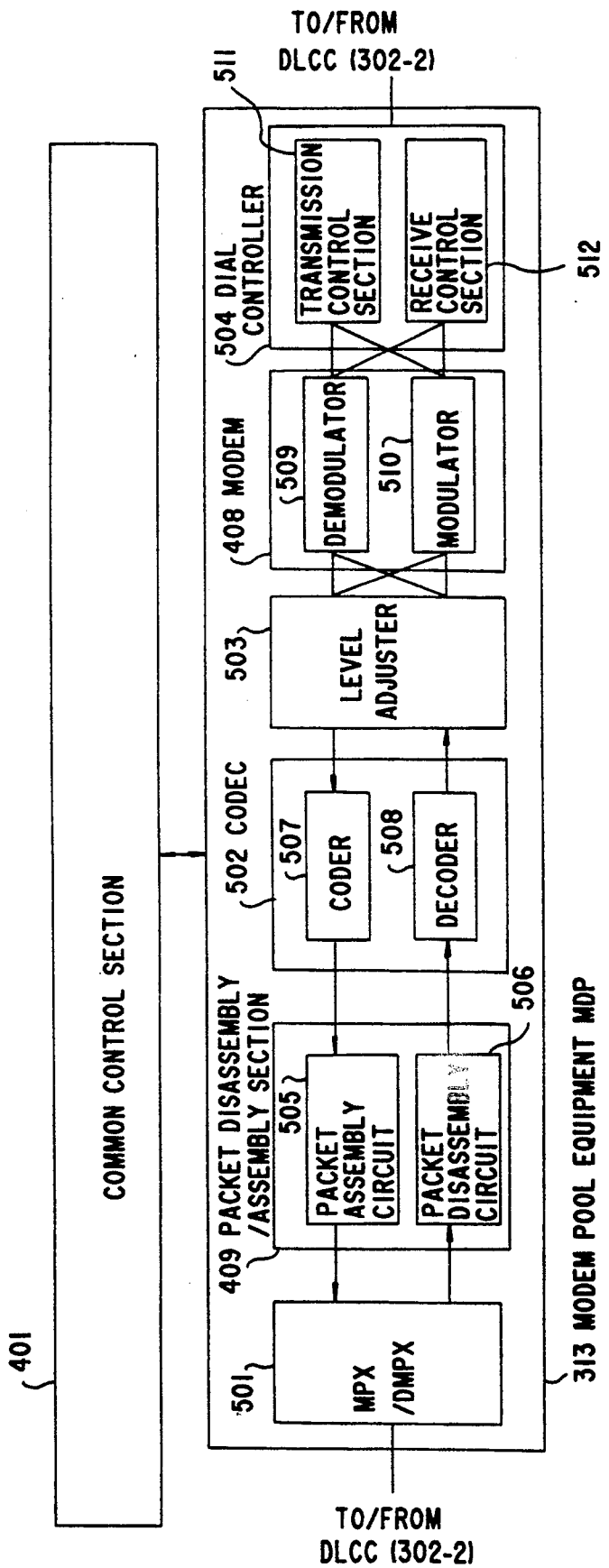
FIG. 5 is a second block diagram of the modem pool equipment of FIG. 2.

FIG. 5 is a block diagram of one piece of modem pool equipment MDP 313 of FIG. 4. Note that several pieces of modem pool equipment are connected to the common control section 401, as illustrated in FIG. 4.

The modem pool equipment 313 comprises a multiplexer/demultiplexer (MPX/DMPX) 501, a packet disassembly/assembly 409, a codec 502, a level adjuster 503, a modem 408 and a dial controller 504 connected in this sequence. The MPX/DMPX 501 and the dial controller 504 are connected to the digital subscriber line card controller DLCC 302-2 (refer to FIG. 3) via the bus 402.

The MPX/DMPX 501 demultiplexes multiplexed packet data sent from the DLCC 302-2 and multiplexes packet data to be sent to the DLCC 302-2. The packet disassembly/assembly section 409 connected to the MPX/DMPX 501 comprises a packet assembly circuit 505 and a packet disassembly circuit 506. The packet disassembly/assembly section 409 is connected to the codec 502, comprised of a coder 507 and a decoder 508.

The coder 507 converts an analog signal to character data and inputs it to the packet assembly circuit 505, which assembles the character data into packet data and outputs it to the MPX/DMPX 501. The packet data demultiplexed in the MPX/DMPX 501 is entered into the packet disassembly circuit 506 to be disassembled into character data. The character data is sent to the decoder 508 for conversion to an analog signal.

The codec 502 comprised of the coder 507 and the decoder 508 is connected to the level adjuster 503 which appropriately adjusts the amplitude of an analog signal. The level adjuster 503 is connected to the modem 408, comprised of a demodulator 509 and a modulator 510, which is in turn connected to the dial controller 504 comprised of a transmission control section 511 and a receive control section 512.

A signal sent from the telephone network 310 via the ISDN switching unit 301 is received by the receive control section 512 of the modem pool equipment 313 via the DLCC 302-2, demodulated by the demodulator 509 and then applied to the level adjuster 503. An analog signal obtained from the decoder 508 adapted for analog-to-digital conversion and having its amplitude adjusted by the level adjuster 503 is modulated by the modulator 510 and then transmitted from the transmission control section 511 to the DLCC 302-2. The analog signal is sent to the telephone network 310 via the DLCC 302-2 and the ISDN switching unit 301.

Figure 6:
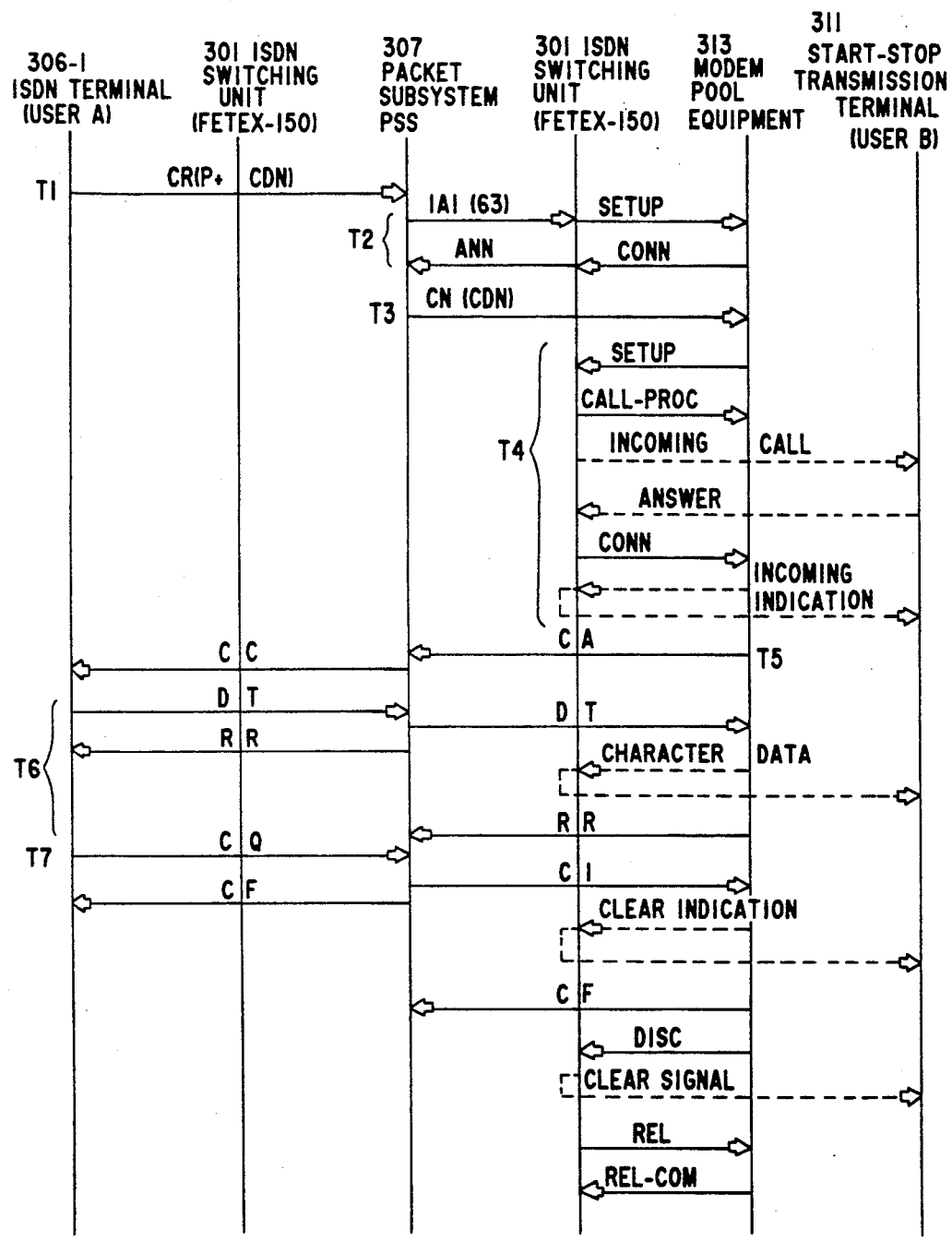
FIG. 6 illustrates a modem pool equipment access sequence.

FIG. 6 illustrates a sequence of access to the modem pool equipment. It shows a procedure for transmission from the ISDN terminal 306-1 (user A) to the start-stop transmission terminal 311 (user B) connected to the telephone network 310.

User A performs an operation for transmission on the basis of the D-channel packet switching procedure. More specifically, the ISDN terminal 306-1 sends a call control packet called CR (call request) to the packet subsystem PSS 307 on the basis of the normal ISDN protocol (T1). The call control packet (CR) contains data on a receive subscriber number which has a data structure of "P+CDN". "P" is a number (prefix) indicating the type of attribute of the modem pool equipment, such as line speed or data length, while "CDN" is the telephone number of user B (start-stop transmission terminal 311) connected to the analog data network. If the prefix of the modem pool equipment of 1200 bits per second is "8" and the telephone number of user B is "777-1111" as in the example of operation described in conjunction with FIG. 3, then "8+777-1111" will be sent as data in the format of "P+CDN".

Upon receipt of the CR packet and recognition of the receive subscriber number therein beginning with "P", the packet subsystem 307 sets up a call for the modem pool equipment 313 via the ISDN switching unit 301 (IAI and SETUP of T2). The packet subsystem 307 then replaces the prefix "P" with the multi-line hunt (key number) allocated to the modem pool equipment and transmits it. That is, the packet subsystem 307 translates the prefix "8" to the corresponding multi-line hunt "777-1200" and accesses the modem pool equipment 313 using this telephone number.

Figure 7:
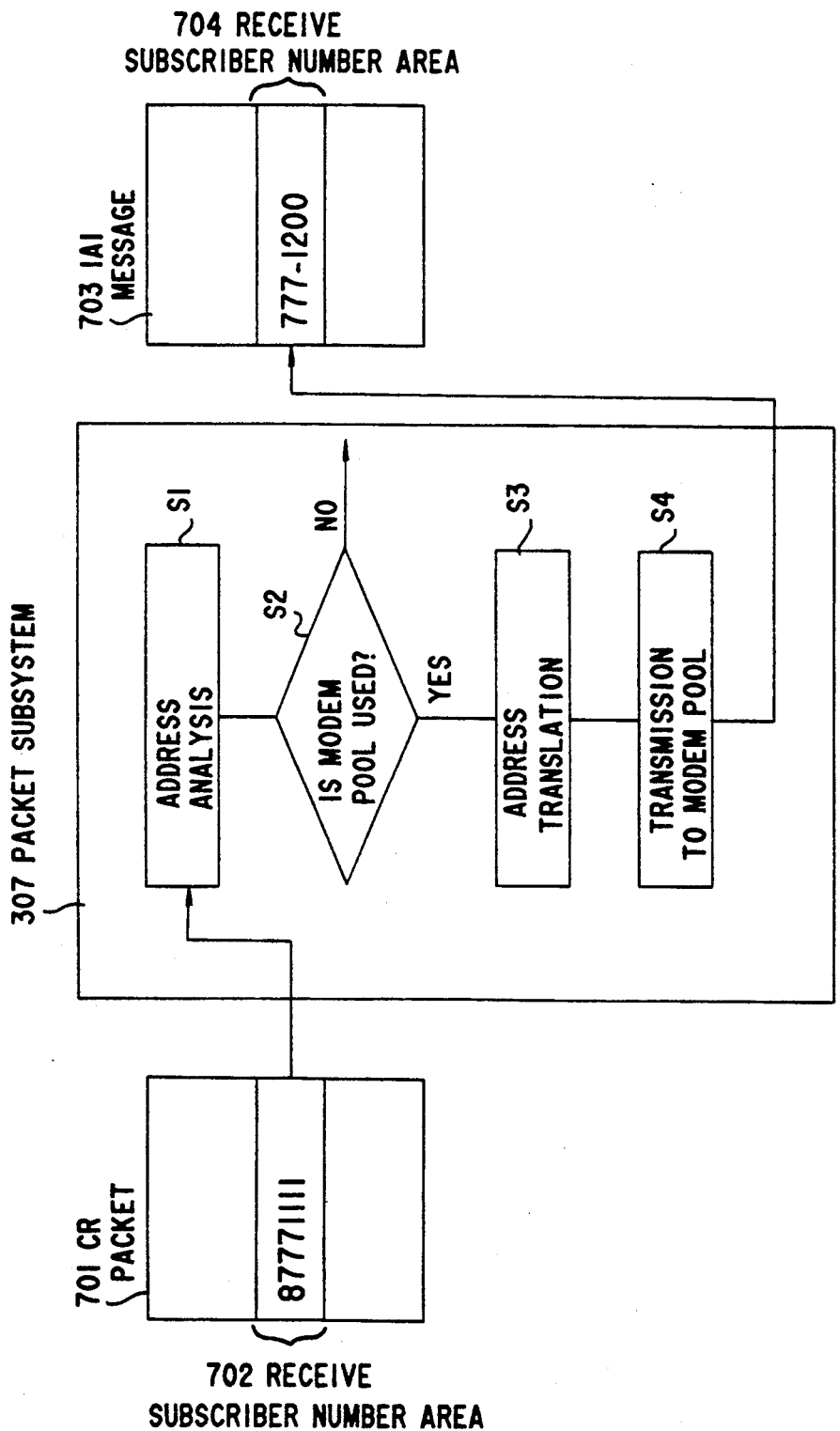
FIG. 7 is a flowchart for a translation of a prefix to a key telephone number in the packet subsystem.

FIG. 7 is a flowchart of translation of a prefix to a multi-line hunt by the packet subsystem 307.

The CR packet 701 transmitted by the ISDN terminal 306-1 is provided with a receive subscriber number area 702 in which data in the format of "P+CDN" is inserted. Suppose now that the receive subscriber number is "87771111" (the prefix P2 is "8" and the telephone number "CDN" of the start-stop transmission terminal 311 is "7771111").

Upon receipt of the CR packet 701, the packet subsystem 307 first conducts address analysis (S1). That is, the subsystem 307 decides whether or not the receive subscriber number is headed by a predetermined prefix code (S2). If the receive subscriber number is headed by the prefix code, the packet subsystem 307 uses the modem pool equipment. If not, the subsystem does not use the modem pool equipment.

When the modem pool equipment is not used (in case NO), the packet subsystem 307 carries out the normal communication procedure afterward. When it is used (in case YES), the packet subsystem 307 performs address translation of the receive subscriber number (S3). That is, the prefix "8" is replaced with the multi-line hunt "777-1200" of the modem pool equipment of 1200 bits per second. On completion of the address translation (S3), the packet subsystem 307 uses the above number for transmission to the modem pool equipment (S4). That is the above number "777-1200" is inserted into the receive subscriber number area 704 of a transmission message (IAI message 703) to the ISDN switching unit 301 and the message is then transmitted.

Assuming that the prefix "9" represents modem pool equipment of 2400 bits per second and its multi-line hunt is "777-2400", then the packet subsystem 307 replaces the prefix "9" with multi-line hunt "777-2400", inserts this number in the receive subscriber number area 704 of the IAI message 703 and transmits this message.

Upon receipt of the IAI message 703 from the packet subsystem 307, the ISDN switching unit 301 issues a connection request to modem pool equipment having a multi-line hunt of "777-1200" (IAI and SETUP of T2 in FIG. 6). The modem pool equipment having the multi line hunt performs a connecting operation in response to the connection request and returns a CONN (connect) signal to the ISDN switching unit 301 on completion of the connection (CONN of T2). Upon receipt of the CONN signal, the ISDN switching unit 301 sends an ANN signal to the packet subsystem 307 (ANN of T2) to inform it of the completion of connection to the modem pool equipment 313.

Upon receipt of the ANN signal, the packet subsystem 307 sends a CN packet to the modem pool equipment 313 (T3). The CN packet contains the subscriber number "CDN" ("777-1111") of user B (start-stop transmission terminal 311) connected to the analog telephone network 310. Upon receipt of the CN packet, the modem pool equipment 313 performs a process of establishing a communication path to user B (start-stop transmission terminal 311) (T4). First, the modem pool equipment 313 issues to the ISDN switching unit 301 a SETUP signal (a signal indicating a request for connection to the analog subscriber "777-1111"). The ISDN switching unit 301 returns CALL-PROC (call proceeding) to the modem pool equipment 313 and issues a connection request (Incoming Call) signal to user B (start-stop transmission terminal 311). The "Incoming Call" signal indicated by the dotted lines in FIG. 6 is an analog signal.

An Answer signal is sent from user B to the ISDN switching unit 301 on completion of connection to user B. In response to the Answer signal, the ISDN switching unit 301 sends to the modem pool equipment 307 a CONN (connect) signal indicating that a communication path has been established. As a result, a two-stage communication path of the modem pool equipment 313 - the ISDN switching unit 301 - user B is established. When the communication path is established, the modem pool equipment 307 sends to user B an "Incoming indication" signal indicating what type of call has been made over this communication path.

When the communication path between the modem pool equipment 313 and user B is established by the communication path establishing process (T4), the modem pool equipment 313 sends a CA packet to the packet subsystem 307 to inform it tha t the communication path has been established (T5). The packet subsystem 307 sends a CC packet (call connect packet) to user A (ISDN terminal 306-1) to request the establishment of a communication path. In this way, the communication path between users A and B is established.

Next, the actual data transfer is carried out (T6). Packet data (DT) sent from the user A is applied to the packet subsystem 307 via the ISDN switching unit 301. The packet subsystem 307 sends the packet data (DT) to the modem pool equipment 313 via the ISDN switching unit 301 and an RR (receive ready) packet confirmation signal indicating that the packet data (DT) has been received by user A.

Upon receiving the packet data (DT), the modem pool equipment 313 translates it to character data and sends it to user B (character data indicated dotted line in FIG. 6). The data arrives at the start-stop transmission terminal 311 of user B via the ISDN switching unit 301. After sending "character data" to user B, the modem pool equipment 313 sends to the packet subsystem 307 an RR packet confirmation signal indicating that data has been received. In this way, data is transferred from user A to user B.

A process of disconnecting the communication path is performed at the completion of the data transmission (T7). First, user A (ISDN terminal 306-1) sends to the packet subsystem 307 a CQ packet (call clear request packet) to request disconnection. Upon receiving the CQ packet, the packet subsystem 307 sends a CI (clear indication) signal to the modem pool equipment 313 and returns a CF packet (clear confirmation packet) to user A. The communication path between user A and the packet subsystem 307 is thereby disconnected.

The modem pool equipment 313 is responsive to the CI signal to send to user B a character signal indicating disconnection and to the packet subsystem 307 a CF packet (clear confirmation). The communication path between the modem pool equipment 313 and the packet subsystem 307 is thereby disconnected. The modem pool equipment 313 further sends to the ISDN switching unit 301 a DISC (disconnect) signal to request disconnection. In response to the DISC signal, the ISDN switching unit 301 sends to user B a Clear signal to request disconnection from the analog network and to the modem pool equipment 313 an REL signal indicating that disconnection from the analog network has been executed. The modem pool equipment 313 returns to the ISDN switching unit 301 an REL-COM signal indicating that the REL signal has been received, whereby the communication path between the modem pool equipment 313 and the ISDN switching unit 301 is disconnected.

By the above control operations, the communication paths between users A and B are all disconnected, so that the data communication is completed.

Figure 8A:
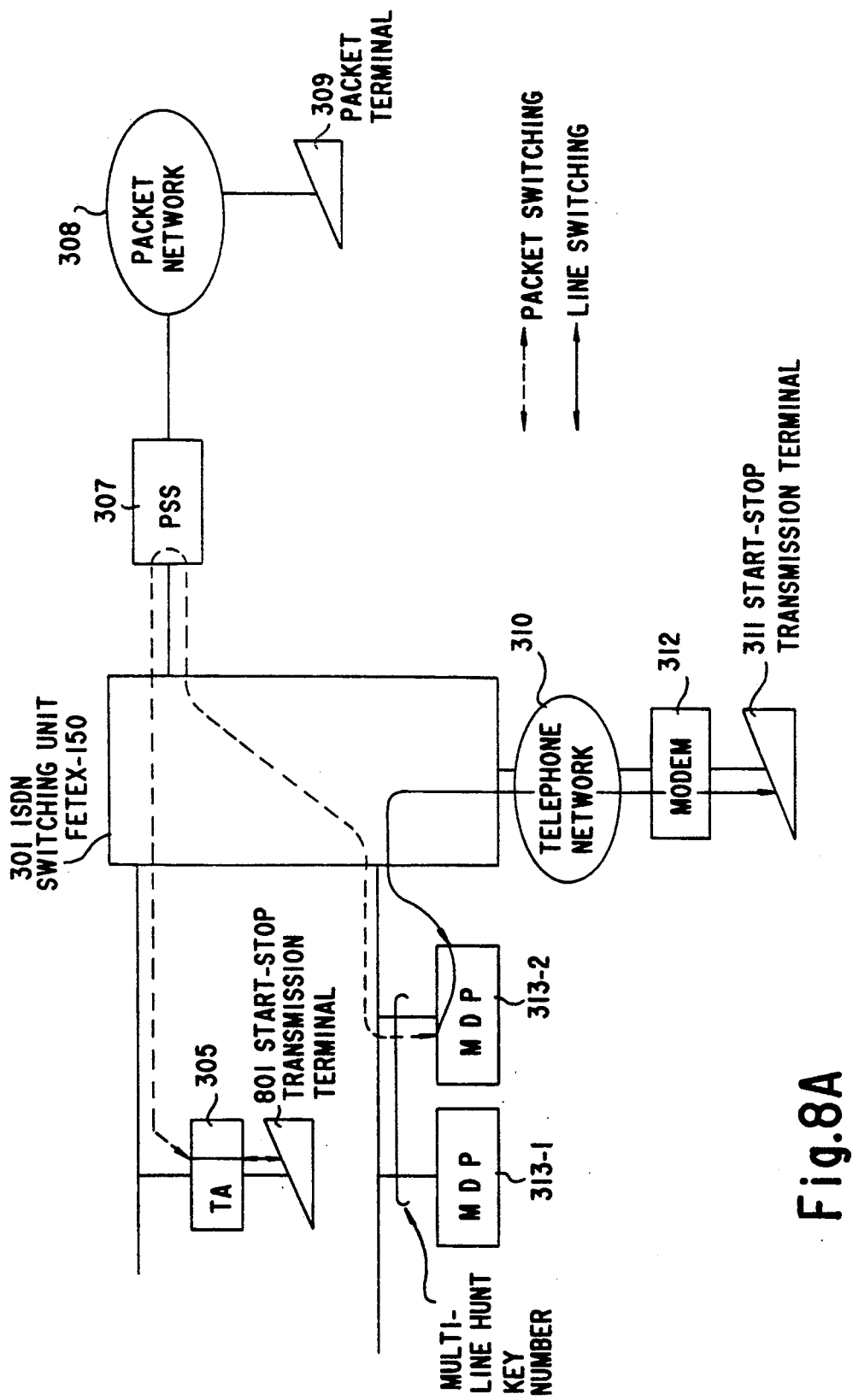
FIG. 8A illustrates an example of a communication between start-stop transmission terminals.
Figure 8B:
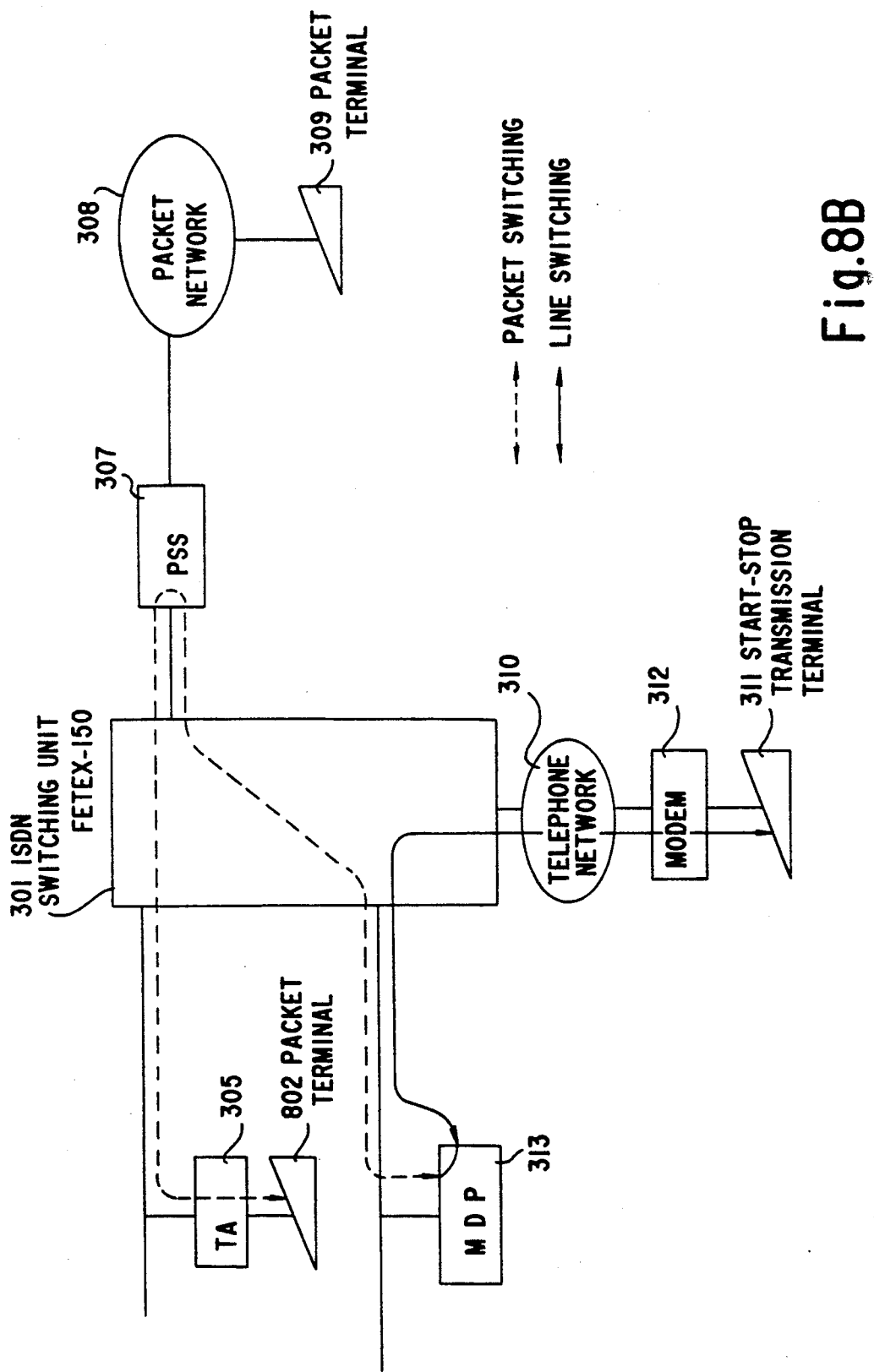
FIG. 8B illustrates an example of a communication between a start-stop transmission terminal and a packet terminal.
Figure 8C:
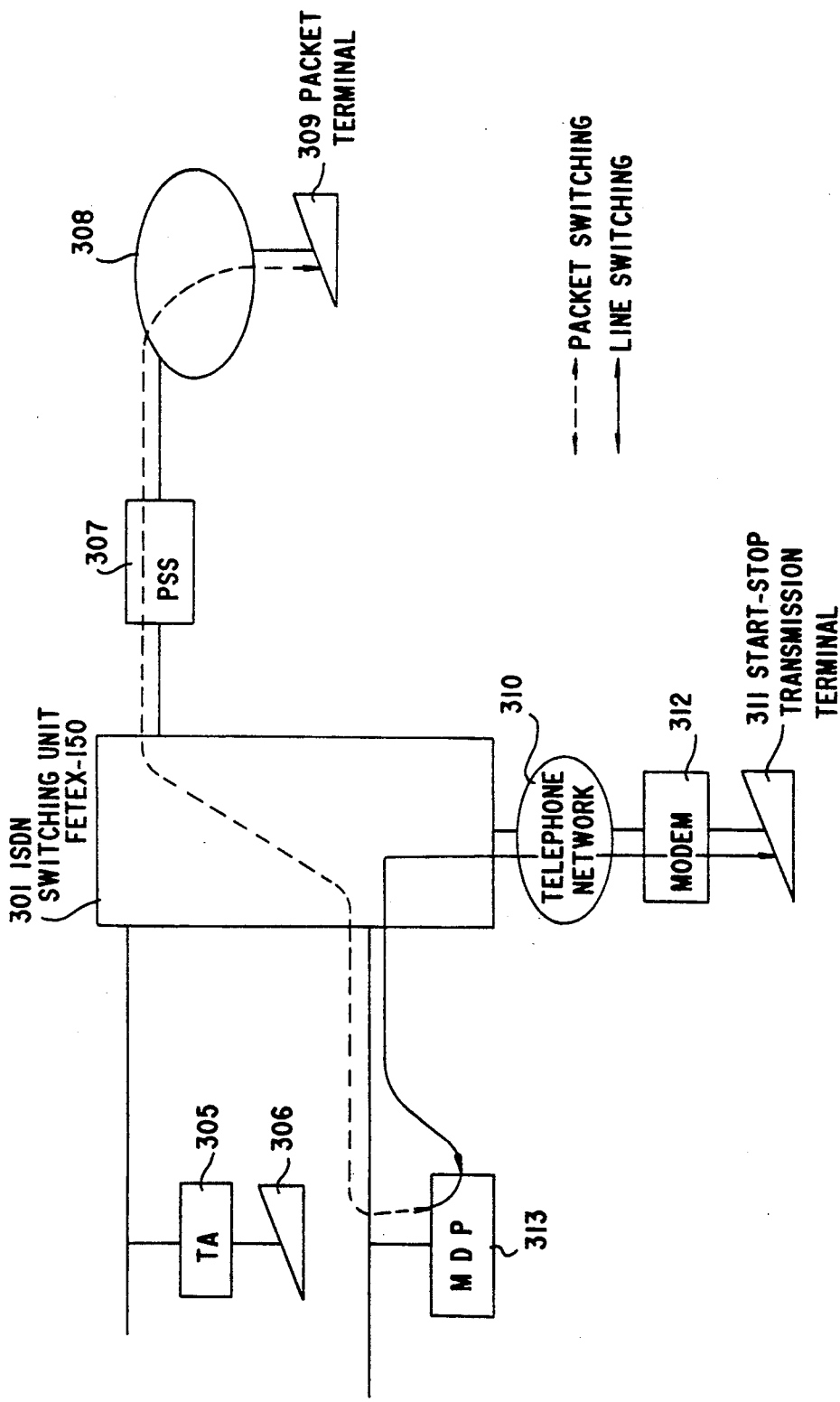
FIG. 8C illustrates an example of a communication between a start-stop transmission terminal and terminal in the packet network.

FIGS. 8A, 8B and 8C illustrate examples of data communications.

As illustrated in FIG. 8A, for data communications between a start-stop transmission terminal 801 contained in the ISDN and the start-stop transmission terminal 311 connected to the analog telephone network 310 via the modem 312, a communication path is established which extends from the start-stop transmission terminal 801 through the terminal adapter 305, the ISDN switching unit 301, the packet subsystem 307, the ISDN switching unit 301, the modem pool equipment 313, the ISDN switching unit 301, the telephone network 310 and the modem 312 to the start-stop transmission terminal 311. Communications between the start-stop transmission terminal 801 in the ISDN and the terminal adapter 305 and between the modem pool equipment 313 and the start-stop transmission terminal 311 in the analog network are performed in the line switching procedure, while communication between the terminal adapter 305 and the modem pool equipment 313 is performed in the packet switching procedure.

On the other hand, for data communications between a packet terminal 802 in the ISDN and the start-stop transmission terminal 311 in the analog telephone network as illustrated in FIG. 8B, a communication path is established from the packet terminal 802 through the terminal adapter 305, the ISDN switching unit 301, the packet subsystem 307, the ISDN switching unit 301, the modem pool equipment 313, the ISDN switching unit 301, the telephone network 310 and the modem 312 to the start-stop transmission terminal 311. In this case, the communications between the packet terminal 802 in the ISDN and the modem pool equipment 313 are performed with the packet switching procedure, while the communications between the modem pool equipment 313 and the start-stop transmission terminal 311 in the analog telephone network 310 are performed with the line switching procedure.

For data communications between the packet terminal 309 in the packet network 308 and the start-stop transmission terminal 311 in the analog telephone network 310 as illustrated in FIG. 8C, the packet terminal 309 sends to the packet subsystem 307 the subscriber number of the start stop transmission terminal 311 and a prefix of modem pool equipment as a receive subscriber number. The packet subsystem 307 translates the prefix to a multi-line hunt to thereby establish a connection to the modem pool equipment 313. Furthermore, the modem pool equipment 313 establishes a communication path to the start-stop transmission terminal 311. A communication path is thereby established from the packet terminal 309 through the packet network 308, the packet subsystem 307, the ISDN switching unit 301, the modem pool equipment 313, the ISDN switching unit 301, the telephone network 310 and the modem 312 to the start-stop transmission terminal 311 In this case, the communications between the packet terminal 309 and the modem pool equipment 313 are performed with the packet switching procedure, while the communications between the modem pool equipment 313 and the start-stop transmission terminal 311 are performed with the line switching procedure.

As described above, communications between various terminals included in the ISDN and the start-stop transmission terminal of an analog network, or between the packet terminal included in the packet network connected to the ISDN and the start-stop transmission terminal in the analog network can be carried out by using a packet exchange sequence without providing a modem in the ISDN terminal side of the packet terminal side.

As described above, the present invention permits data communications between various types of terminals contained in an ISDN and a start-stop transmission terminal in an analog network and between a packet terminal contained in a packet network connected to the ISDN and a start-stop transmission terminal in the analog network using the packet switching procedure without the necessity of installing a modem on the side of a terminal in the ISDN or packet terminal. That is, by attaching modem pool equipment to an ISDN switching unit, it becomes possible to perform the above communications without incurring by the expense to the users.

The use of the packet switching procedure offers an improvement in line-use efficiency over the line switching procedure. Furthermore, data communications are permitted between any type of ISDN terminal, such as a start-stop transmission terminal or a packet terminal in an ISDN or a packet terminal in a packet network connected to the ISDN, and a terminal in an analog network.

What is claimed is:

1. An ISDN exchange system with modem pool equipment for performing data communication between a packet terminal connected to an ISDN through a packet network and a start-stop transmission terminal connected to said ISDN through a modem and an analog telephone network comprising:
- a modem pool equipment group having a plurality of pieces of modem pool equipment each of said pieces corresponding to a common plurality of communication attributes, each of said pieces of modem pool equipment including means for receiving packet data and converting said packet data to character data for transmission and means for receiving said character data and re-converting said character data to packet data for transmission;
- a modem pool equipment designating means for designating one of said pieces of modem pool equipment corresponding to the communication attribute of a data communication; and
- communication path establishing means for establishing a communication path between said designated piece of modem pool equipment, said packet terminal and said start-stop transmission terminal.

2. An ISDN exchange system with modem pool equipment for performing data communication between a packet terminal connected to an ISDN through a packet network and a start-stop transmission terminal connected to said ISDN through a modem and an analog telephone network, comprising:
- a plurality of pieces of modem equipment each having a distinct set of communication attributes, and each including means for receiving packet data and converting said packet data to character data for transmission and means for receiving said character data and re-converting said character data to packet data for transmission;
- a prefix transmission means for transmitting a prefix designating a specific set of communication attributes of a data communication from the packet terminal side;
- a modem pool equipment designating means for designating one of said pieces of modem pool equipment corresponding to the value of said prefix transmitted from said packet terminal side by said prefix transmission means;
- a communication path establishing means for establishing a communication path between said designated piece of modem pool equipment, said packet terminal and said start-stop transmission terminal.

3. An ISDN exchange system with modem pool equipment for performing data communication between a packet terminal connected to said ISDN through a packet terminal network and a start-stop transmission terminal connected to said ISDN through a modem and an analog telephone network, comprising:
- a plurality of pieces of modem pool equipment each having a plurality of communication attributes and connected in modem pool groups to an ISDN as a subscriber terminal, each piece including means for receiving packet data and converting said packet data to character data for transmission; and means for receiving said character data and converting said character data to packet data for transmission and for establishing a communication path to a corresponding start-stop transmission terminal based on a received subscriber number;
- a prefix transmission means for transmitting a received subscriber number transmitted by saud packet terminal and a prefix designating a predefined communication characteristic of said data communication from said packet terminal; and
- a modem pool equipment designating means for designating one of said piece of modem pool equipment corresponding to the value of said prefix transmitted form the packet terminal side by said prefix transmission means and establishing a communication path to said corresponding start-stop transmission terminal corresponding to said received subscriber number, thereby establishing a communication path between said packet terminal and said start-stop transmission terminal.

4. The ISDN exchange system according to claim 3, wherein:
- said plurality of pieces of modem pool equipment have a subscriber number thereon and said modem pool equipment designating means converts said prefix value to a corresponding subscriber number and accesses the piece of modem pool equipment corresponding to said corresponding subscriber number.

5. The ISDN exchange system according to claim 3, wherein;
- each piece of modem pool equipment in a common modem pool group has the same communication characteristic and corresponds to a common prefix, and said modem pool equipment designating means for converting said value of said prefix to the corresponding key subscriber number, for accessing a group of said pieces of said modem pool equipment corresponding to said key subscriber number, thereby setting a communication path to one of said plurality of pieces of modem pool equipment which is not used in said group of said plurality of pieces of modem pool equipment.

6. The ISDN exchange system according to claim 3, wherein:
- said modem pool equipment designating means is provided in said packet subsystem for terminating said packet terminal connection to said ISDN exchange.

7. The ISDN exchange system according to claim 3, further including:
- means for connecting said ISDN terminal in an ISDN to said modem pool designating means.

8. The ISDN exchange system according to claim 3, wherein:
- said packet terminal is provided in a packet network connected to said ISDN.

* * * * *